Dec. 12, 1967     C. F. B. STEVENS     3,357,381
TOILET WASTE COMBUSTOR
Filed May 18, 1966
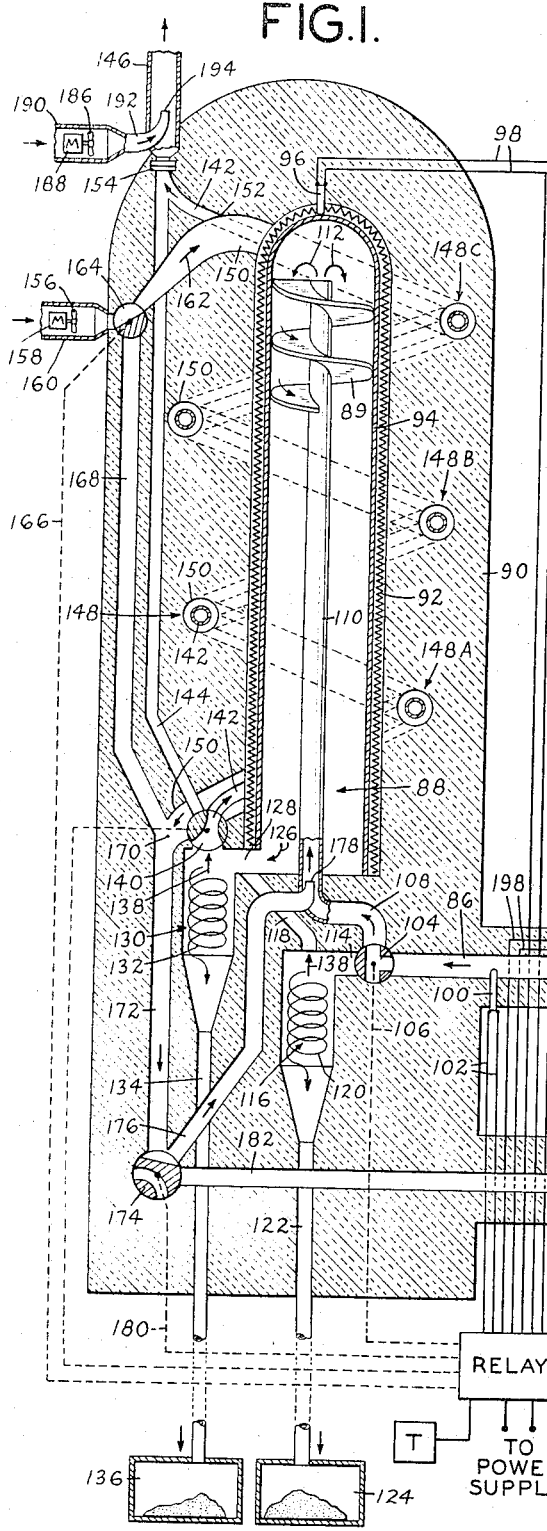
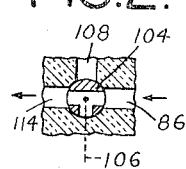
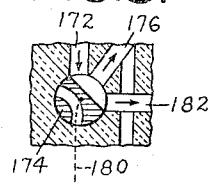
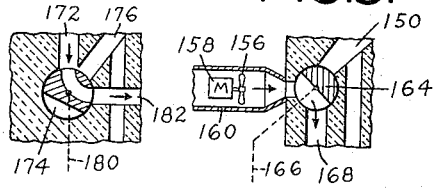
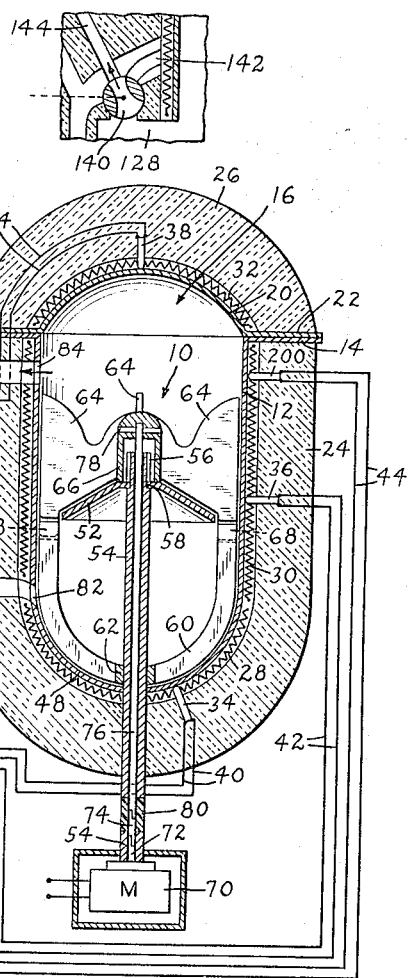

United States Patent Office 3,357,381
Patented Dec. 12, 1967

3,357,381
TOILET WASTE COMBUSTOR
Charles F. B. Stevens, Pierrefonds, Quebec, Canada, assignor to Pulp and Paper Research Institute of Canada, a corporation of Canada
Filed May 18, 1966, Ser. No. 551,154
9 Claims. (Cl. 110—9)

ABSTRACT OF THE DISCLOSURE

An incinerator toilet suitable for installation in living quarters to make final disposal of toilet waste at the time and place of deposit by combustion to substantially any desired high degree of solid and gaseous materials with discharge to atmosphere of water and $CO_2$ and automatic discharge of inert ash to storage chamber. First combustion chamber is toilet stool having heating means, means for subdividing and dispersing solids and means for supplying air in preheated or non-preheated condition. Waste is deposited in first chamber with heating, subdividing and air-supplying means inoperative. Second combustion chamber for gaseous materials, having heating means and means and means for supplying air in preheated condition is heated to predetermined minimum operating temperature after which, if toilet stool is closed, the heating, subdividing and air supplying means for first chamber are energized to initiate disposal cycle. Waste material is dried, pyrolyzed and in part burned in first chamber and the mixture of air, vapours and gaseous materials is continuously conducted to preheated second chamber whereby combustible portions of mixture are burned to a very high degree of completeness from very beginning of cycle. Since the toilet waste material deposited in the first chamber is a batch the amounts of heat and air supplied to the batch in the first chamber is reduced or increased as required to maintain a predetermined temperature level in the conduit between the first chamber and second chamber so that the rate at which combustible gaseous materials are evolved from the batch is not permitted to exceed the capacity of the second chamber to burn such combustible gaseous materials to the desired degree of completeness.

A. BACKGROUND

(1) Scope

This invention relates to a method and apparatus for the disposal of material such as toilet waste.

More particularly, this invention relates to a method and apparatus for the disposal of material such as toilet waste at the time and place of production of said waste by combustion to innocuous gases and sterile ash to a very high degree of completeness, and the automatic disposal of the ash.

By "toilet waste" is meant feces and urine as well as other body discharges which occur in lesser amounts and cellulosic and other combustible fibrous materials such as sanitary tissues, wadding, gauze and the like but excluding non-combustible materials altogether; by "combustion" is meant union with oxygen (normally atmospheric oxygen) at elevated temperature at or near atmospheric pressure; and by "complete" combustion is meant that the products of combustion have zero residual oxygen demand; and the degree of completeness (in percent) achieved in any particular instance is defined by the following formula:

$$\frac{(\text{Orig. O}_2 \text{ demand}) - (\text{sum of resid. O}_2 \text{ demands of prods.}) \times 100}{\text{Orig. O}_2 \text{ demand}}$$

(2) Disadvantages of present methods of toilet waste disposal

The customary procedure for disposing of toilet waste from urban and suburban buildings consists of its reception in water and collection by water carriage through sewers to a central point, where it is or should be reduced to innocuous products, by either biological degradation or combustion. This procedure has several disadvantages. Population is beginning to outrun water supply in many areas, yet almost half the present domestic water consumption is used merely to collect toilet waste. Sewers are expensive, the more so per household in the suburbs where the population density is less. The two thousandfold dilution of the toilet waste by the water increases the difficulty and cost of purifying the whole before releasing it into watercourses. And finally the use of high-wet-strength paper disposables (in hospitals as well as homes) is hindered by the fact that they are difficult to dispose of into a water-carriage system, yet may be too noxious or bulky to dispose of with the garbage.

(3) Disadvantages of present toilet waste incinerators

The above disadvantages of central collection by water-carriage could evidently be avoided by an incinerator which would transform toilet and similar wastes into innocuous products at the time and place of production and permanently dispose of said products on the spot. This fact has long been appreciated and many such incinerators have been put forward; but all those of which applicant is aware suffer from drawbacks which have precluded their acceptance in built-up areas. Of these drawbacks the most important is that the exit gases are incompletely burned, especially at the start of the incineration cycle. Another is that the solid residue from incineration has to be removed manually from the unit for final disposal. A third is that the receiving section of many of the units is complex and difficult to keep clean.

(4) Basic factors and practical parameters governing completeness of combustion Of the above disadvantages the most basic is that of incomplete combustion. In my co-pending application for United States Patent Ser. No. 484,861 filed Sept. 3, 1965, the conditions for achieving combustion to a very high degree of completeness are described in detail. Briefly, when a particle of wet organic waste is heated preparatory to combustion, it first dries, evolving water vapour and organic volatiles; then breaks down under the action of heat to both gaseous and solid pyrolysis products, the latter subsequently burning to carbon monoxide as well as carbon dioxide. The complete combustion of such material therefore involves both (a) a gas-gas system in which the organic volatiles, the gaseous pyrolysis products, and the carbon monoxide burn, and (b) a solid-gas system in which the solid pyrolysis products burn, these two different systems being necessarily linked by the passage of air and gas-phase material containing combustibles from the latter to the former. Completion of the heterogeneous drying, pyrolysis, and combustion reactions in the solid-gas system is accelerated by comminuting and/or spreading the original material into relatively thin layers and heating it rapidly while dispersing it in a current of preheated air. Driving combustion to completeness in the homogeneous gas-gas system requires creating an adequate combination of values of the four basic factors—the excess partial pressure of air, the efficiency of mixing the gas-phase material and air, the temperature to which this mixture is heated, and the time it is kept at this temperature. Since the gas-gas system is necessarily a flowing one, this has to be done through the practical parameters of rate of evolution of gas-phase material, rate of addition of air, oxygen demand and heating value of gas-phase material, reactor dimensions, the heat in combustion products returned to the feed, and the rate of supply of external heat.

(5) *Fixing the basic factors through the practical parameters*

The basic factor values created through the practical parameters do not have to remain the same throughout the course of combustion—they merely have at all times to form a combination which is adequate for the degree of combustion desired. However, this raises the question of what combinations are adequate, and the simplest approach is to establish empirically *one* set as adequate, and seek to keep each basic factor at or above its respective value in this set. In seeking to achieve this, the above practical parameters can all readily be fixed except the flow rate of the gas-phase material to be burned and its oxygen demand (and heating value). If, however, an upper limit can be set on the latter by relating it to the composition of the feed, it remains only to fix the flow rate of the gas-phase material to be burned. In the invention in the above-mentioned co-pending application Ser. No. 484,861 both these criteria are met by comminuting the original material, which in said application is garbage, feeding and dispersing it continuously at a constant rate into a reaction space, and there heating it so rapidly in a current of preheated air, that the evolution of gas-phase material containing combustibles proceeds at a constant rate practically the same as the constant rate of feeding. This procedure at the same time satisfies the conditions for a very high degree of completeness of combustion in the solid phase.

(6) *Cleanliness and the feed system*

However, this type of solution, involving continuous feed of the material to be burned, is inappropriate in the case of toilet waste. The grinder-feeder train to a waste disposer needs to be cleaned between cycles; cleaning can be done either by washing or by burning away the soil. A continuous grinder-feeder must be located outside the hot zone and it therefore must be washed. But to wash a toilet waste grinder-feeder would take so much water that the heat load, and hence energy-time requirements of the disposer, would become too great. The solution to this problem provided by the present invention is to receive and grind or otherwise subdivide the charge as a whole directly in the vessel which later will be the combustion zone and hence will be burned clean during operation.

(7) *Controlling the rate of evolution of gas-phase material and batch feed*

However, this batchwise approach means that the rate of evolution of gas-phase material containing combustibles can no longer be kept constant by making it march with the constant rate of continuous feed. At any given rate of heating the batch charge, the rate of evolution of gas-phase material containing combustibles will start at zero and increase until pyrolysis is nearly complete, after which it will become much smaller. This peaking is intensified by the small but appreciable exothermic heat of pyrolysis, of the order of 200 B.t.u./lb. dry solids, which is released in the latter stages of carbonization. If some air is added to the charge from the start, to sweep out the chamber and so hasten drying and pyrolysis (air must be added in the last stage anyway to burn off the solid products of pyrolysis), then to the external heat will be added heat of combustion reckoned on the air (which averages 1400 B.t.u./lb.), and the production of gas-phase material containing combustibles will peak still more, to the point in fact where it becomes difficult to define. Yet for combustion in the gas-gas system to the desired degree of completeness, a minimum excess partial pressure of air must still be achieved, along with efficiency of mixing, and time, as well as temperature, in an adequate combination. The present invention solves this problem by placing an empirical upper limit on the rate of evolution, and hence the flow rate of gas-phase material containing combustibles, as follows:

(a) Action is started by preheating a secondary gas-gas combustion chamber to a combustion temperature and then supplying external heat at the maximum rate, and some air, to the charge in a first combustion chamber, while the remainder of the air is sent to the gas-gas secondary combustion chamber where it mixes with the gas-phase products as they are released.

(b) When a thermosensitive element in the first combustion chamber reaches a preset temperature, it shuts off the external heat supplied to said first chamber, and switches all the air to the secondary chamber, thus to restrict the rate of evolution in the first chamber to a value which does not exceed the capacity of the secondary chamber to cause combustion of the products of said evolution.

(c) When later said thermosensitive element falls below a preset temperature, it turns on the external heat again and switches part of the air back to the primary chamber, thus to maintain evolution in the first chamber reasonably close to the maximum restricted rate.

(8) *Control of the other parameters and factors*

By these means the peak rate of evolution of the gas-phase material containing combustibles can be controlled to a reasonable, if empirical, value. If an upper limit can still be assigned to the oxygen demand of this gas-phase material, it would then be possible, with a fixed air rate, to assure a minimum excess partial pressure of oxygen, as required. But the oxygen demand of the gas-phase material from a batch feed as contrasted with continuous feed at a controlled rate is not uniquely linked to the oxygen demand of the feed being processed at the moment. For any given batch feed composition, the oxygen demand of the evolved gas phase starts low, increases to a maximum at about the same time as the maximum rate of gas-phase evolution, and later decreases as the pyrolysis stage approaches an end. However, for toilet waste the maximum oxygen demand of the solids when dry is only a small fraction of the possible maximum oxygen demand of garbage solids which may include substantial quantities of fat, for example. Consequently a reasonable upper limit can be set empirically on the oxygen demand of the gas-phase material containing combustibles evolved in a toilet-waste combustor. The total air rate is then fixed at a value which will give the chosen excess partial pressure of oxygen even with the maximum combined flow rate-oxygen demand of the gas-phase materials containing combustibles, and all of this air is sent to the secondary combustion chamber during the maximum rate period of pyrolysis. Efficient mixing can be accomplished in accordance with the principles of said co-pending application Ser. No. 484,861 by designing the secondary chamber for the required degree of turbulence even at the minimum flow.

B. OBJECTS AND BRIEF DESCRIPTION

It is therefore an object of this invention to provide a method and an apparatus for the disposal of toilet wastes which avoid the disadvantages of present devices, and which take advantage of the above findings.

Another object of this invention is to provide final disposal of toilet wastes at the time and place of production by combustion to the very high degree of completeness required in an urban area.

Another object of this invention is to provide an apparatus which receives, subdivides, and disperses toilet waste and provides it with enough air, mixing, temperature, and time to burn both the gaseous and the solid products to an acceptable degree of completness, and automatically deposits the solids as a powder of ash in a permanent vault.

Another object of this invention is to provide a method and an apparatus which will burn toilet waste with the expenditure of no more energy and space than is normally or reasonably available in a dwelling, yet which will satisfy the criteria of unit surface temperature, safety, and reliability dictated by amateur operation within finished living space.

Other objects of the invention will be apparent from the following description.

According to the present invention, the foregoing objectives are accomplished by receiving the waste in a primary combustion chamber, closing this chamber, making at least a rough separation of liquid and solid components, sub-dividing the solids and dispersing the charge with means provided within the chamber, continuously evolving gas-phase material containing combustibles from said charge initially by the action of preheated air and heat introduced from an external source and limiting the rate of evolution of said gas-phase material and limiting the amount of combustion occurring in the first chamber by shutting off said external heat and the air when the temperature in the said chamber reaches a preset point thus avoiding runaway reaction in the first chamber, and continuously withdrawing the gas-phase material so evolved from the first chamber and conducting it to a second chamber which is preheated to combustion temperature before the charge is heated in the primary chamber and which is so designed that by the addition of preheated air at a controlled rate the excess partial pressure of air, efficiency of mixing of said gas-phase material and air, temperature, and residence time are adequate in combination to achieve combustion to the required high degree of completeness, removing suspended ash particles from the combusted stream and depositing them in a permanent vault, transferring to the incoming air most of the heat in said cleaned combusted stream and venting said stream to the atmosphere, turning on again the supply of external heat and air to the first combustion chamber when the temperature falls to a preset value, continuing the supply of heat and air for a time adequate to burn the solid pyrolysis products to the desired high degree of completeness, and finally flushing the ash from the first combustion chamber with air and depositing it in a permanent vault. It is a special feature of the present invention that the shutting off of the external heat supply to the first chamber in response to the reaching of a predetermined temperature therein prevents runaway evolution of gaseous materials in said first chamber, thereby assuring that the maximum rate of such evolution will not be in excess of the capacity of the second chamber to achieve the desired high degree of combustion therein of the materials evolved in the first chamber.

C. DETAILED DESCRIPTION

(1) Structure

The present invention will be better understood by reference to the accompanying drawing, which illustrates one electrically-heated form of the apparatus embodying the invention. It will be understood that the invention is capable of many modifications, and that changes in the construction and arrangement may be made without departing from the spirit and scope of the invention as defined in the claims.

In the drawing:

FIG. 1 is a generally vertical sectional view of the apparatus; with many parts shown in diagrammatic fashion; and FIGS. 2 through 6 are somewhat diagrammatic sectional views of various valves in different positions corresponding with particular operational phases of the cycle of operation.

Referring to FIG. 1 the particular embodiment of the invention chosen for illustration comprises a wide-mouth first-combustion and charge-receiving chamber 10. The chamber 10 comprises an inner metal wall 12 circular in cross-section and preferably smoothly flared to form a generally circular flange 14 which serves as a toilet seat. The chamber 10 is provided with a cover 16 hinged at 18 so that it may be placed in a generally vertically displaced open position (not shown) in which the chamber 10 may be used as a toilet. The cover 16 comprises an inner metal wall 20 also preferably smoothly flared to provide a circular flange 22 which, in the closed position illustrated in FIG. 1, will fit smoothly and tightly sealed against the toilet seat flange 14. The chamber 10 is provided with a thick body of thermal insulating material 24 and the cover 16 is provided with similar thermal insulating material 26. The chamber 10 is also provided preferably, with three separately powered electrical heating elements 28, 30 and 32, the latter being positioned in the cover 16. The heating elements 28, 30 and 32 are provided respectively with thermal sensitive devices such as thermostats 34, 36 and 38 connected respectively by wires 40, 42 and 44 with a relay box 46 and through suitable relays therein and through suitable additional wiring (not shown) with a source of electrical power and with the particular heating elements with which each of the thermostats is associated.

The inner metallic wall 12 of the chamber 10 is smoothly formed to provide a semi-spherical bottom portion 48 and the inner metallic wall 20 of the cover 16 is also preferably smoothly curved and approximately semi-spherical in configuration whereby when the cover 16 is closed the interior of the chamber is smooth and free of crevices and the like.

Within the combustion and charge-receiving chamber 10 there is provided a suitable mechanism for making a rough separation of the liquid and solid materials which are placed therein by a user and which also will serve to subdivide the solid or viscous portions of the charge into such condition that they may be readily and quickly dried, pyrolized and eventually burned. While apparatus of the latter type may take many forms there is illustrated one suitable form which includes a generally frusto-conical receiving plate 52 which is held stationary upon a non-rotatable tube 54, the latter extending through a suitable opening in the bottom portion 48 of chamber 10 and preferably being tightly sealed, as by welding, within the opening to prevent leakage of any of the contents of the chamber 10. The receiving plate 52 may be held in fixed relation with the tube 54 in any suitable, preferably demountable manner, for instance by providing the upper outer end of the tube 54 with a set of splines 56 which receive suitable mating splines 58 formed in the plate 52.

A plurality of curved scraper blades 60, there being four such blades illustratively shown in FIG. 1, are rigidly assembled with a hub member 62 which is freely rotatable upon the outer periphery of the tube 54. The curved scraper blades 60 are so contoured as quite closely to conform with the inner surface of the metal wall 12 and the semi-spherical bottom portion 48 thereof. Above the stationary receiving plate 52 there is positioned a suitable number, four being illustrated herein, of scraper blades 64 which are secured to an inverted cup 66. The blades 64 are so contoured as quite closely to conform with the cylindrical inner surface of the wall 12 and with the upper surface of the plate 52. Each blade 64 is provided at its lower end with a tongue 68 which extends into a suitable socket in the upper end of the lower scraper blade 60 with which the upper scraper blade 64 corresponds. It will be recognized that in assembling the device the lower scraper blades 60 are first lowered upon the tube 54 and the stationary receiving plate 52 is then lowered into its operating position where it rests in the bottoms of the splines 56. Thereafter the upper scraper blades and cup 66 are positioned over the upper end of the tube 54. The lower edge of the cup 66 bears upon a suitably contoured portion of the upper surface of the receiving plate 52. In positioning the upper scraper blade 64 the tongues 68 thereof are inserted into the sockets provided in the lower blades 60 whereby said upper and lower scraper blades are united for rotation relative to the stationary receiving plate 52.

A motor 70, preferably of a gear reduction type, providing a relatively low speed of rotation, is mounted in fixed relation with the non-rotatable tube 54. The drive shaft 72 of motor 70 is connected, preferably through a thermally insulative shaft section 74, with a drive shaft 76 which extends upwardly through the tube 54 and emerges from the upper end thereof to receive a key 78. The key 78 is inserted through suitable openings in the cup 66 and the upper end of the drive shaft 76 to provide for rotation of the scraper blades 60 and 64 when the motor 70 is energized. Preferably the tube 54 is provided adjacent the motor 70 with a thermally insulative tubular insert 80 which with the insulative shaft section 74, serves to protect the motor 70 from the high temperatures to which the upper portion of the tube 54 are subjected in operation of this device.

Below the receiving plate 52 the chamber 10 is provided with an inlet 82 for air and above the plate 52 the chamber 10 is provided with an outelt 84 for air and the products of the reactions which occur within the chamber 10. When a charge of toilet waste is deposited in the chamber 10 the solid or viscous substances, if any, will tend to remain upon the upper surface of the receiving plate 52 while the liquid components, if any, will flow from the plate 52 into the lowermost portion of the chamber 10. The chamber 10 is so sized and the inlet opening 82 and outlet opening 84 are so positioned that neither the solid nor the liquid components of any expected charge of waste material will serve even temporarily to block either of these openings. Also the electrical heating elements are disposed with regard for varying heat loads placed thereupon by a charge of toilet waste material. Thus the heating element 28 for the lowermost portion of the chamber 10, in which liquid is deposited, may have a relatively high heat output. The heating element 30 for the intermediate zone of the chamber 10 may not require as much heat output as the lowermost heater 28. The heating element 32 for the interior of the cover 16 may have even a smaller output. However, as will be explained in more detail below the heating capacity and the insulative enclosures 24 and 26 are such that the interior of the chamber 10 may rapidly rise to and be maintained at such a value as quite rapidly to dry, pyrolized and burn or boil away the various components of a typical batch of toilet waste. For this reason the inner walls 12 and 20 as well as the scraper blades 60 and 64 and receiving plate 52 must be made of suitable durable stainless or other heat resistant metal or alloys capable of operation under temperatures in the order of 1500° F.

The outlet 84 of the chamber 10 is connected through a conduit 86 with a second combustion chamber generally indicated by the reference numeral 88. The second combustion chamber 88 is enclosed within a heavy, thick thermally-insulative body 90 and is provided with one or more electrically powered heating elements 92. The second combustion chamber 88 is provided with an inner metallic wall 94 of suitable heat resistant metal or alloy. A thermally sensitive unit, such as a thermostat 96, is positioned, preferably, at or near the top of the second combustion chamber 88. The thermostat 96 is connected through wires 98 with the relay box 46 and through further wires (not shown) to a suitable source of electrical power and to the heating element or elements 92. The heating capacity of the element or elements 92 and the thickness and characteristics of the thermally insulative material 90 are both so chosen as to maintain within said secondary combustion chamber a suitable high operating temperature as will be more fully discussed hereinbelow.

The interior of the second combustion chamber 88 normally should be subdivided in such a manner as to give a very substantial length of continuous relatively narrow passageway through which the stream of air and combustible materials may flow in a turbulent condition with all volumetric elements thereof being assured of adequate retention time as will be more fully explained below.

The subdivision of the volume of the second chamber to establish such a path may be accomplished in any suitable manner. For instance a spiral baffle 89, only a small portion of which is shown in FIG. 1, may be fitted in chamber 88 so as to provide a spiral path of considerable length extending from the top to the bottom of chamber 88. In most cases it may be preferable to provide several concentric, nested baffles to afford an even longer continuous path.

In the conduit 86, which extends between the first combustion chamber 10 and the second combustion chamber 88, there is provided a thermally sensitive unit 100, such as a thermostat, which is connected through wires 102 with the relay box 46. The thermostat 100 is arranged, through the relay box 46 and suitable wiring (not shown), to control at selected portions of the cycle, the heating elements 28, 30 and 32 for the first combustion chamber 10 and to control a multi-way valve 104 positioned within the conduit 86. The valve 104 is driven by a suitable mechanism indicated by the dotted lines 106 to occupy, as desired, the position shown in FIG. 1 in which gaseous materials and usually some finely divided solid materials such as ash, may flow from the first combustion chamber 10 through a passageway 108 into a vertically disposed tube 110 which comprises a first section of the second combustion chamber 88 for discharge into the second section of the second combustion chamber near the upper end thereof as indicated by arrows 112. Alternately, the valve 104 is moved for the ash flushing portion of the cycle, as will be described below, to occupy the position shown in FIG. 2 wherein the materials flowing through the conduit 86 are directed to a passageway 114 which enters the upper end of a cyclone, or other suitable gas-solid separating device, 116. In the latter position the combined stream of gas and solid particles which may be flowing through the conduit 86 is separated in the cyclone 116 with the cleaned gas flowing upwardly through a passageway 118 to the outlet of the second combustion chamber 88. The solid particles, if any, will follow the spiral path indicated diagrammatically at 120 in FIG. 1 to fall through a chute 122 to a permanent ash vault 124 located appropriately elsewhere within the building. The position of the valve 104 illustrated in FIG. 2 is assumed only toward the end of a cycle of operation for the purpose of flushing of ash from the first combustion chamber 10.

During the preheating and active burning portions of the cycle of operation the valve 104 ordinarily will remain in the position illustrated in FIG. 1 whereby gaseous material will flow directly from the first chamber 10 to the second chamber 88. In such phases of the cycle gaseous materials as well as the solid particles, if any, which enter the second chamber 88 eventually pass through the entire length thereof to be discharged as indicated by the arrow 126 through an outlet passage 128 to the upper end of another cyclone, or similar gas-solid separating device, 130. In the cyclone 130 the solid materials will follow the spiral path indicated diagrammatically by the arrow 132 to fall through a chute 134 to a second permanent vault 136 located elsewhere within the building. The cleaned gas will flow upwardly from the cyclone 130 as indicated by the arrow 138 to a multi-position valve 140 which is in such a position, as shown in FIG. 1, as to direct such gas into the inner tube 142 of a heat exchanger. The valve 140, during the ash flushing portion of the cycle is moved to the position shown in FIG. 6 wherein the cleaned gas flows through a bypass passageway 144 which extends upwardly to join with a flue or stack 146 leading to the atmosphere. Except during the ash flushing portion of the cycle the cleaned hot gases exiting from the second combustion chamber 88 are directed to the inner tube 142 of the preheater as mentioned above.

The preheater is in the form of a helix surrounding the second combustion chamber 88 and embedded in the insulating material 90. The preheater is generally indicated by the reference numeral 148 and it comprises not only the inner tube 142 aforesaid but also comprises an outer tube 150 concentric with the inner tube. The outer tube 150 extends to a point 152 near the upper end of the second combustion chamber 88 at which point the inner tube 142 is brought through the wall of the outer tube 152 and is sealed at such point of emergence as by welding. The inner tube 142 then extends upwardly and has a filter element 154 positioned therein to retain any solid particles which by chance might reach this point. The inner tube 142 then extends into the flue 146 for discharge of clean gaseous materials to the atmosphere.

Fresh air is supplied to the outer tube 150 of the air preheater 148 by a fan 156 driven by motor 158, the fan being positioned in an air inlet tube 160. The air driven by the fan 156 ordinarily will flow, as indicated by the arrow 162, into the outer tube 150 of the air preheater 148. A multi-position valve 164 is positioned in the air inlet system and, as shown in FIG. 1, is so positioned as to direct the air from fan 156 into the preheater 148 as just described. The valve 164 is operated by linkage indicated generally at 166 from the relay box 46 to occupy, when desired, the position shown in FIG. 5. In the latter position the air supplied by fan 156 is directed downwardly to a by-pass conduit 168 which joins at point 170 with the outlet end of the outer tube 150 of the air preheater 148. Thus preheated or unheated air may be directed to the point 170 as desired. In the position shown in FIG. 1, fresh air is preheated. As will be described below an ash flushing operation is carried out towards the end of the cycle to sweep ash remaining in the first combustion chamber 10 to gas-solid separating devices. This operation preferably is carried out with unheated air so that the first combustion chamber 10 may be cooled for the next use without cooling the second combustion chamber 88. Thus the valve 164 is moved to the position shown in FIG. 5 during the ash-flushing portion of the cycle.

The preheater 148 for the incoming air is, as noted above, coiled around the second combustion chamber 88. While only a few turns have been shown it will be understood that a relatively large number of turns ordinarily will be provided. Starting from the lower end of the air preheater 148 it will be noted that the first turn of the coil indicated at 148A is quite close to the second chamber 88 and thus is buried deeply within the insulation 90. The second turn 148B and successive turns 148C etc., are progressively further away from the chamber 88 and are progressively less deeply buried within the insulation 90. By appropriate calculation, taking into account the temperature involved and the efficiency of the insulating material 90, these successively expanding turns of the air preheater are so designed that the temperature of the exterior of the outer tube 150 closely approximates the ambient temperature of the surrounding insulating material. It will be understood that when the fresh air first enters tube 150 at the upper end thereof it will have approximately the temperature of the surrounding atmosphere from which it was drawn. Also at the upper end of the preheater 148 the temperature of the exiting gaseous materials will have dropped as a result of heat transfer within the air preheater. Thus the last few turns of the preheater coil may lie close to the outer surface of the insulating material 90. However as the air continues to flow downwardly through outer tube 150 it will progressively assume a temperature rather closely approaching that of the hot gases first exiting from passageway 128 at the lower end of the second combustion chamber 88. The lowermost turns of the preheater coil 148 thus lie deeply within the insulating material 90. Such procedure conserves heat and assures that the temperature of the outer surface of the insulating body 90 is kept down to a level acceptable for domestic appliances.

The air supplied to the apparatus by the fan 156, whether preheated by passage through heat exchanger 148 or not preheated by passage through the by-pass 168, is caused to flow through conduit 172 to a multi-position valve 174. In the position shown in FIG. 1 such air is directed by valve 174 to conduit 176 and ejector jet 178 at the lower end of upcomer 110 in the second combustion chamber 88. The air thus supplied to the second combustion chamber serves as combustion air for the burning of the combustable constituents of the stream flowing from the first combustion chamber 10 to the second combustion chamber 88. The ejector jet 178 causes a drop in pressure within the conduit 86 and thus serves to promote the flow of the stream from the first combustion chamber 10.

The valve 174 is moved by suitable linkage indicated diagrammatically by the dotted line 180 to other positions at proper times in the cycle and in response to thermal conditions as will be explained below. In the position shown in FIG. 3 the valve 174 will direct incoming air to the second combustion chamber 88 through the conduit 176 and also to the first combustion chamber through a conduit 182, which as shown in FIG. 1, leads to the inlet 82 of the first combustion chamber 10. Preferably, the valve actuating linkage 180 is controlled at proper times within the cycle, to move back and forth between the positions shown in FIGS. 1 and 3 whereby to supply or to cut off to the first combustion chamber in response to thermal sensing of the thermostat 100 in the outlet of the first combustion chamber.

The valve 174 is also movable to the position shown in FIG. 4 wherein the air is directed only to the first combustion chamber 10 through conduit 182. This position is assumed only during the ash flushing portion of the cycle as will be explained below. For the moment, however, it should be pointed out that with the valve 174 in the position shown in FIG. 4, the valve 164 in the position shown in FIG. 5 and the valve 140 in the position shown in FIG. 6 fresh cool air will be directed to the first chamber 10 to flush ash therefrom and to cool the first chamber for the next use without cooling of the second combustion chamber 88. In this way, the preheating portion of the next cycle of use may be shortened or perhaps eliminated since the second combustion chamber may be maintained at or near full operating temperature during flushing, cooling and the possible next use of the first chamber 10 for the deposit of another charge of toilet waste material therein.

As mentioned above the flue 146 is arranged to discharge to the atmosphere. A fan 186 driven by a motor 188 is positioned in an inlet passageway 190 communicating with the atmosphere to propel air through a conduit 192 which enters the flue 146 and is provided with an ejector jet 194 to force gases to flow upwardly within the flue 146. The fan 186 is so designed and balanced with the design of the fan 156 as to maintain the pressure slightly below atmospheric pressure within the conduit 86 during the preheating portion of the cycle and yet to supply an adequate quantity of air for the combustion and gaseous flow conditions required as will be further explained below.

A cover-actuated switch and lock 196 is connected by suitable wiring 198 with relay box 46. The switch and lock may be combined in a single unit or separate units may be provided if so desired. The switch is so positioned that raising of the cover 16 will close circuits involved in initiation of operation of the device and when the cover is thereafter closed the lock wll be effective to prevent reopening of the cover until the cycle of operation is complete.

(2) *Operation*

The operation will be described, first, broadly and then in such further detail as is required for an understanding of the manner in which combustion to the high degree required for use in urban areas is accomplished. For the broad description it will be assumed that the apparatus is completely cold or at least has not been used for a substantial period of time whereby the second combustion chamber 88 is at a temperature below that which is adequate, in view of the various other controlling factors, for satisfactory combustion of gas-phase materials. Under these conditions raising of the cover 16 will permit switch 196 to close and to actuate those relays or other devices within relay box 46 which will cause the preheating portion of the cycle to be initiated as follows:

(a) Fans 156 and 186 will start
(b) Heating element 92 for second combustion chamber 88 will be turned on
(c) Valves 104, 140, 164 and 174 will be moved to the positions shown in FIG. 1 (if they are not already in such position)

The first chamber 10, with the cover open can now be used as a toilet. During such use the chamber 10 will remain at or near room temperature and toilet gases will be constantly withdrawn through outlet 84 and conduit 86 as a result of the sub-atmospheric pressure in conduit 86. The fresh air forced in by fan 156 will flow through preheater 148 downwardly to valve 174 and thence only upwardly through conduit 176 to the inlet end of second combustion chamber 88. Such air will be heated from the inner wall 94 of chamber 88 and after passing cyclone 130 will transfer such heat to the incoming air as it is discharged upwardly through the inner tube 142 of heat exchanger 148. This phase of operation will continue until such time as the temperature sensed by the thermostat 96 in the top of chamber 88 remains below the desired operating temperature. If, before such temperature is reached, the user closes the cover 16 nothing will happen, except that the lock for cover 16 may engage and prevent reopening of the cover if so desired. Alternatively the lock may be of such type that it will not lock the cover until the next step in the cycle is initiated.

In any even the closing of the cover 16 places the apparatus in condition for initiation of the full burning portion of the cycle as seen as desired operating temperature is reached in the second combustion chamber 88.

When the thermostat 96 senses that the selected operating temperature for example about 1500° F. is reached the cover 16 is locked if closed and if not already locked, and the next portion of the cycle will be initiated immediately or as soon thereafter as the cover is closed, as follows:

(a) Valve 174 is moved to the position shown in FIG. 3
(b) Heating elements 28, 30 and 32 are turned on
(c) Motor 70 is started
(d) A timer T is started
(e) Control of heaters and air supply for the first combustion chamber 10 is turned over to the thermostat 100.

During this portion of the cycle the scraper blades 60 and 64 serve to smear and cut or shred solid or viscous matter and paper, if any, in the batch of waste material. The solid or viscous matter thus is deposited and spread as a thin layer upon the receiving plate 52 and perhaps upon the inner surface of the wall 12 of chamber 10 whereby it may be rapidly dried and pyrolized. Liquid portions of the batch will accumulate in the lower semi-spherical portion 48 of chamber 10 where the heating element 28 will serve to evaporate moisture and then to pyrolyze organic substances therein. Vapors and gaseous products from the drying and pyrolizing operations will be discharged through outlet 84 and conduit 86 to the second combustion chamber 88 which, being at full operating temperature, is effective to burn to the desired degree of completeness the very first gaseous materials evolved from the waste material. This is an important and, it is believed, novel way of overcoming an outstandingly deficient aspect of previous incinerating devices for the handling of batches of materials of the type here involved.

Burning of the products in the second combustion chamber 88 is accomplished by maintaining the temperature in chamber 88 within a narrow operating range and by supplying at least an adequate amount of air at all times. If the temperature in the second chamber 88 rises above the preset temperature the thermostat 96 will be effective to shut off the heating element 92 as the temperature falls below the preset point the heating element 92 again will be turned on.

Preferably, the thermostat 96 in the second chamber 88 does not control the heating elements and air supply for the first chamber 10 except as pointed out above that the latter cannot be turned on or put into operation to initiate the pyrolizing and burning operations in the first chamber 10 unless and until the thermostat 96 indicates that the second chamber 88 is at the preset operating temperature. After this first indication by thermostat 96 in each complete cycle the control of heat and air for the first chamber is turned over to the thermostat 100 in the conduit 86.

When drying of the various portions of the batch of waste is completed pyrolysis begins and shortly thereafter the gas phase pyrolysis products begin to burn in the limited air supply provided to the first chamber 10. When the temperature at temperature sensor or thermostat 100 reaches a preset value the latter is effective to turn off the heating elements 28, 30 and 32 in chamber 10 and to move valve 174 back to the position shown in FIG. 1, thus to cut off the air supply to chamber 10. Pyrolysis will continue for a period of time dependent upon the size of the charge. During pyrolysis the temperature at thermostat 100 may fall below the preset value in which event the heaters 28, 30 and 32 will be turned on and the valve 174 will be moved whereby some air again will be supplied to chamber 10. Switching back and forth in this respect may occur several times before the evolution of combustible products of pyrolysis diminishes to such a point that burning of the solid products begins and proceeds as such solids continue to be dispersed and mixed with air by the rotation of the scrapers 60 and 64.

After a time, preset in the timer T, and chosen as adequate for the combustion to the desired high degree of all solids in the maximum expected charge of toilet waste materials, the timer is effective to set up the ash-flushing portion of the cycle as follows:

(a) All heaters 28, 30, 32 and 92 are shut off
(b) Valve 164 is moved to the position shown in FIG. 5 to direct incoming air down the by-pass 168
(c) Valve 104 is moved to the position shown in FIG. 2 to direct materials from conduit 86 to cyclone 116 and then to cyclone 130
(d) Valve 174 is moved to the position shown in FIG. 4 to direct all air to conduit 182 and thus to the inlet of chamber 10
(e) Valve 140 is moved to the position shown in FIG. 6 causing the cleaned air or gaseous material leaving cyclone 130 to flow only to the by-pass 144 and thus to the flue 146
(f) The speed of fans 156 and 188 may be increased if deemed necessary, by a factor, sufficient in relation to the now reduced resistance of the system to gas flow, to give an air velocity through first chamber 10 sufficiently high to entrain the ash particles, which are constantly being stirred by scrapers 60 and 64, and to carry such particles to the cyclones 116 and 130.

After a period of time, preset into the timer T and chosen to be sufficient to insure complete removal of the maximum expected amount of ash from the chamber 10, the timer T may stop and return to its zero position, leaving the apparatus in the ash-flushing and cooling mode whereby the cooling of the chamber 10 by air flow is continued until the chamber 10 becomes sufficiently cool for the next use. For this purpose the control of the fans 156 and 186 and of the scraper blade motor 70 is transferred to a thermally-sensitive element 200 (see FIG. 1) which senses the temperature of the metal inner wall 12 of chamber 10. When a predetermined relatively cool temperature is sensed by the element 200 the fans, and scraper blades are stopped and the cover is unlocked. A suitable signal such as a pilot light may be utilized to indicate that the toilet is in condition for the next use.

(3) *Design considerations*

From the forgoing detailed description of apparatus and operation it will be recognized that the objectives of the present invention may be achieved by an apparatus the operation of which by a user is simple and safe. The design and sizing of the apparatus for its intended purpose depends principally upon the maximum rate of oxygen demand of the gas-phase products which are continuously withdrawn from the first chamber 10. The rate of oxygen demand, being dependent on the volumetric flow rate of the gas-phase products as well as their oxygen demand per unit of volume, may as described above, be limited by the designer in respect of the maximum expected charge by his choice of the operating temperature of the first chamber 10 and by the cutting off of the supply of external heat and air to said chamber when such operating temperature is exceeded. Having thus defined the maximum rate of the oxygen demand of the gaseous products to be burned in the second chamber the designer then provides for the second chamber a supply of preheated air adequate to insure that at any time especially when maximum rate of oxygen demand exists a predetermined excess partial pressure of air is maintained.

The amount of this excess partial pressure, together with the temperature, residence time, and degree of mixing (i.e. turbulence) now constitute the four factors governing the degree of completeness with which these gaseous products will be burned. The set of values chosen for these four factors must therefore be adequate for the degree of completeness desired in view of the material in question to be burned. While an infinite number of such sets can theoretically be adequate, from the practical point of view it is important to select a set in which if possible each value can be realized economically.

In the case of the excess partial pressure of oxygen the most convenient value is about 0.03 atm. abs. since this is 15% of its partial pressure in the atmosphere.

The preset operating temperature selected for the second chamber 88 should be relatively high to keep the cycle short, but on the other hand should not be so high as to require the use of unduly expensive materials of construction. A temperature of 1500° F. satisfies these conditions.

The turbulence should be sufficient to effect mixing throughout the gas-phase without being so high as to call for an uneconomical amount of fan energy. Hence a just fully developed turbulence, represented by a Reynolds number of about 2100, would be appropriate. The turbulence depends principally upon the total flow rate of the gas-phase, its viscosity, and the diameter of the flow passages. The total flow rate is established in this apparatus primarily by the rate of air addition chosen, and the viscosity differs little from that of air at the operating temperature. Hence the desired degree of turbulence is effected by choosing the flow passage diameter, i.e., by the design of the baffles 89 and subdivisions of the second combustion chamber 88.

The final governing factor for a desired degree of completenesses of combustion is the residence time at the operating temperature. Upon this time, together with the total volumetric flow rate of the gas-phase, depends the volume required to be enclosed by the second chamber 88, which should not of course be unduly large for installation in living space. However, it has been found, when using the values of the other three governing factors mentioned above, that the residence time required to burn materials such as toilet waste to a high degree of completeness is of the order of only 3 seconds.

It will be understood, of course, that the same degree of completeness of combustion could be obtained by other combinations of values of the above four factors e.g., by a higher temperature and more turbulence combined with a proportionately shorter time and lower excess partial pressure of oxygen. Also, a degree of combustion as high as required can be obtained by increasing the values of one or more of the above four factors by the means described.

Obviously various modifications and additions may be made to the apparatus of the present invention to comply, for example, with local building, electrical code and similar regulations which might impose unusual requirements. Also, while toilet waste material has a relatively low heating value and is expected to be deposited in this apparatus in amounts of relatively small dry weight, it is possible that some user might deposit other materials of higher heating value. To avoid the possibility, under these circumstances of the combustion chambers being overheated a further control may be added to the combustion chambers which, if the temperature therein continues to rise after the external heating means have been shut off, would turn valve 164 to direct the incoming air through by-pass 168 instead of through preheater 148 thus supplying cool air instead of preheated air to the chambers.

What is claimed is:

1. Apparatus for burning in a cycle which consists of drying, pyrolyzing and burning to a very high degree of completeness a batch of waste material, such as toilet waste, which consists of vaporizable, combustible and usually also ash-producing substances which during heating evolve (a) gas-phase material including combustibles and (b) solid material which on combustion evolves (i) further gas-phase material including combustibles and usually (ii) ash, comprising a first chamber for receiving a batch of said waste material, means for heating and supplying air to the waste material in said first chamber causing said material to evolve said gas-phase material by the successsive reactions of drying, pyrolyzing and burning, said first chamber having an exit conduit through which at least the gas-phase products of said reactions leave said first chamber, temperature sensitive means associated with said first chamber for sensing the temperature of the products exiting from said first chamber, means responsive to said temperature sensing means for reducing the amounts of heat and air added to said materials in response to the detection by said temperature-sensitive means of a temperature above a predetermined level and for increasing said amounts in response to detection by said temperature-sensitive means of a temperature below said predetermined level thus to define a maximum rate of oxygen demand of the combustible gas-phase products thus evolved from said batch of waste material, and a second chamber connected through said exit conduit with said first chamber, said second chamber being so constructed and arranged as to burn to said desired high degree of completeness the materials thus evolved.

2. The apparatus as set forth in claim 1 having means for suppling air to said second chamber continuously at a rate sufficient to maintain a partial pressure of oxygen in predetermined excess of the maximum rate of oxygen demand of said combustible gas-phase products, and wherein said second chamber comprises an elongated passageway having a cross-sectional area so related to the mass-flow rate and the viscosity of the mixture of air and gas-phase products through said passageway as to produce and maintain a turbulence of flow represented by a Reynolds number above about 2100, and said passageway having a length so related to said cross-sectional area and the volumetric flow rate of said mixture as to establish a predetermined retention time of each volumetric element of said mixture, and means for establishing within said second chamber a temperature adequate in view of said excess partial pressure of oxygen, said turbulence of flow and said retention time to burn the combustible portion of said mixture to said very high degree of completeness.

3. The apparatus of claim 2 in which said means for establishing a temperature within said second chamber comprises heating means energizable from an external source, temperature sensitive means within said second chamber and means responsive thereto for controlling the energization of said heating means within said second chamber to maintain the temperature in said second chamber at least at said adequate value.

4. The apparatus of claim 3 having means responsive to the temperature sensitive means in said second chamber for placing the means for adding heat and air to the first chamber under the control of the temperature sensitive means in the first chamber only after the temperature in the second chamber has reached for the first time in each cycle of operation of said apparatus a temperature at least equal to said adequate value.

5. The apparatus of claim 1 wherein there is provided in said first chamber power driven means for agitating, subdividing and dispersing the material in said first chamber during evolution of gas-phase products therefrom.

6. The apparatus of claim 5 wherein there is provided means for continuing the operation of said power driven means and the heating of and the supplying of air to, under the control of said temperature sensitive means, the material in said first chamber to complete the combustion of solid material remaining in said first chamber also to said very high degree.

7. The apparatus of claim 6 wherein there is provided means for continuing the operation of said power driven means and for supplying air to said first chamber at a velocity and in a quantity sufficient to entrain and carry out of said first chamber the ash remaining after combustion of said solid material to said very high degree.

8. The apparatus of claim 7 in which means is provided to terminate the heating of materials in said first chamber and in which the air supplied to carry out said remaining ash is cool and the supply thereof is continued to cool said first chamber.

9. The apparatus of claim 8 in which there is provided means for bypassing said air around the second chamber to avoid cooling thereby of said second chamber.

References Cited

UNITED STATES PATENTS

| | | | |
|---|---|---|---|
| 1,697,524 | 1/1929 | Epstein | 110—18 |
| 1,995,723 | 3/1935 | Van Denborg | 110—8 |
| 2,125,720 | 8/1938 | Hartley | 110—12 |
| 2,845,882 | 8/1958 | Bratton | 110—8 |
| 2,882,534 | 4/1959 | Jauch et al. | 110—9 |
| 2,929,342 | 3/1960 | Young | 110—8 |
| 3,104,629 | 9/1963 | Crawford et al. | 110—8 |

JAMES W. WESTHAVER, *Primary Examiner.*